United States Patent
Weston

(10) Patent No.: US 8,800,390 B2
(45) Date of Patent: Aug. 12, 2014

(54) CONTACT DETECTOR WITH PIEZOELECTRIC SENSOR

(71) Applicant: Michelin Recherche et Technique S.A., Granges-Paccot (CH)

(72) Inventor: David Alan Weston, Henderson, NC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/858,565

(22) Filed: Apr. 8, 2013

(65) Prior Publication Data
US 2013/0220033 A1 Aug. 29, 2013

Related U.S. Application Data

(63) Continuation of application No. 12/160,245, filed as application No. PCT/US2006/003950 on Feb. 7, 2006, now Pat. No. 8,413,519.

(51) Int. Cl.
*G01L 1/10* (2006.01)
*G01G 19/02* (2006.01)

(52) U.S. Cl.
CPC ................................ *G01G 19/024* (2013.01)
USPC ................ 73/862.625; 73/862.637; 340/933

(58) Field of Classification Search
CPC ..... G01G 3/13; G01G 19/021; G01G 24/027; G08G 1/02
USPC .................... 73/862.628, 1.15, 774, 862.621, 73/862.637, 862.639, 862.625
See application file for complete search history.

(56) References Cited

U.S. PATENT DOCUMENTS

| | | | |
|---|---|---|---|
| 3,245,017 A | | 4/1966 | Russell |
| 4,491,051 A | | 1/1985 | Barcus |
| 4,841,494 A | | 6/1989 | Banno |
| 5,079,958 A | * | 1/1992 | Takase et al. ............ 73/862.625 |
| 5,391,844 A | | 2/1995 | Johnson et al. |
| 5,450,077 A | | 9/1995 | Tyburski |

(Continued)

FOREIGN PATENT DOCUMENTS

| | | |
|---|---|---|
| EP | 0 849 574 A | 6/1998 |
| JP | 62-163733 | 10/1987 |

(Continued)

OTHER PUBLICATIONS

Supplementary European Search Report for EP 06 72 0267, mailed Nov. 20, 2009.
Authors: Hyo-Jin Nam, Young-Sik Kim, Seong-Moon Cho, Caroline Sunyong Lee, Jong-Uk Bu and Jae-Wan Hong; Title: "Piezoelectric PZT Cantilever Array Integrated with Piezoresistor for High Speed Operation and Calibration of Atomic Force Microscopy"; Dec. 2002; Journal of Semiconductor Technology and Science, vol. 2, No. 4; pp. 246-252.

(Continued)

*Primary Examiner* — Lisa Caputo
*Assistant Examiner* — Roger Hernandez-Prewit

(57) ABSTRACT

Disclosed is an apparatus and methodology for detecting contact within a monitored area. A piezoelectric sensor is attached to one end of a detector which is positioned for contact by passing items or individuals. The detector may correspond to a plurality of parallel, rubber calendared cables or a strip of polycarbonate resin. Body deformations induced into the detector upon contact travel to the piezoelectric sensor and are detected as strain coupled to the piezoelectric sensor. The apparatus and methodology may be employed to detect vehicular traffic along travel paths, human contact with walls or floors, manufactured product contact with delivery systems or any other physical contact by animate or inanimate objects or individuals.

5 Claims, 3 Drawing Sheets

(56) References Cited

U.S. PATENT DOCUMENTS

| | | |
|---|---|---|
| 5,477,217 A | 12/1995 | Bergan |
| 5,668,540 A | 9/1997 | Bailleul |
| 5,929,391 A | 7/1999 | Petrucelli |
| 6,128,961 A * | 10/2000 | Haronian ................ 73/774 |
| 6,595,063 B1 | 7/2003 | Rogne et al. |
| 2005/0103097 A1 | 5/2005 | Faltum et al. |
| 2010/0269598 A1 * | 10/2010 | Weston ................ 73/862.628 |

FOREIGN PATENT DOCUMENTS

| | | |
|---|---|---|
| JP | 04-55503 | 5/1992 |
| JP | 06-62339 | 9/1994 |
| JP | 07-077944 | 3/1995 |
| WO | WO 03/094128 A | 11/2003 |
| WO | WO 2005/043126 A | 5/2005 |

OTHER PUBLICATIONS

Title: "Micro/Nanotribology and its applications"; Edited by Bharat Shushan; Published by Kluwer Academic Publishers; Date: 1997; Proceedings of the NATO Advanced Study Institute on Micro/Nanotribology and Its Applications held in Sesimbra, Portugal Jun. 16-28, 1996; pp. i, ii, and 41-43.

Authors: W. R. Bowen, R. W. Lovitt, C. J. Wright; Title: "Atomic force microscope studies of stainless steel: Surface morphology and colloidal particle adhesion"; Date: 2001; Published by Kluwer Academic Publishers, Journal of Materials Science 36 (2001); pp. 623-629.

* cited by examiner

CONTACT DETECTOR WITH PIEZOELECTRIC SENSOR

This application is a continuation of and claims priority to U.S. patent application Ser. No. 12/160,245, filed Jul. 6, 2010, which is the national stage entry of PCT/US2006/003950, filed on Feb. 7, 2006, which are incorporated by reference herein for all purposes.

FIELD OF THE INVENTION

The present subject matter generally concerns contact detection. More particularly, the present subject matter relates to a ruggedly constructed sensor designed for placement on a pathway for passage or presence detection of monitored items.

BACKGROUND OF THE INVENTION

There are many occasions and circumstances where it is desirable to monitor items within or passing through a specific area. More particularly, in the instances of vehicle or traffic monitoring it may be beneficial to be able to determine when or if a vehicle passes over a specific point such as might be determined by a vehicle passing over, near or in front of some type of sensor. Non-limiting examples of such vehicle detection include, traffic counting in travel lanes of a roadway, access gate control systems, and warning signal systems designed to warn or advise others of the approach or presence of a vehicle.

Previously available vehicle sensors have taken many forms including pneumatic hoses, optical sensors, radio frequency (RF) coils, electrical cables, and magnetic sensors, as well as other types of sensors. Common examples of such include pneumatic hoses stretched over roadways configured to operating air pressure sensitive switches as sensors for traffic counting stations. Similar configurations have been used as vehicle presence announcement devices in service stations and similar facilities.

Radio frequency (RF) coils have been embedded in roadways to detect passing traffic and at intersections to control traffic lights. More recently coaxial piezoelectric cables such as those disclosed in U.S. Pat. No. 5,477,217 to Bergan entitled "BIDIRECTIONAL ROAD TRAFFIC SENSOR" and U.S. Pat. No. 6,668,540 to Bailleul et al. entitled "DETECTION DEVICE FOR DATA RELATING TO THE PASSAGE OF VEHICLES ON A ROAD" have been suggested for use as a traffic sensor.

An important aspect to the operation of vehicle sensors is the long term reliability of such devices. Depending on operating environment, vehicle sensors may be subject to adverse conditions not only from environmental considerations, but also those resulting from interaction of the vehicles sought to be detected.

Additionally, although certain types of sensors may, after installation, be more protected from environmental conditions and vehicle interaction, they may require more complex construction and installation than might be warranted for some situations. For example, RF sensor coils may be embedded in a roadway by cutting grooves in the roadway and inserting wires into the grooves. Such installation may provide effective protection for the sensor but at a significant installation cost. Moreover, once installed, such RF coils are not readily relocatable if the vehicle detection requirements are only temporary.

Pneumatic hose type sensors may be easily installed by simply stretching them across a roadway and may just as easily be relocated if desired, but such sensors are subject to damage from the tires of the vehicles passing over the hose. In certain environments, for example where heavy trucks may be involved or the tires of such trucks may trap sensor damaging debris such as rocks within the treads, sensors may be easily and quickly damaged.

While various implementations of detection devices and systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved contact detector has been provided.

In an exemplary configuration, a contact detector is provided by associating a deformation sensitive sensor with a robust cable.

In one of their simpler forms, contact detectors are provided by securing a deformation sensitive device to one end of a cable, the cable being configured to be able to withstand both harsh environmental conditions as well as severe physical abuse during normal operations.

Another positive aspect of this type of device is that a contact detector may be easily, temporarily placed at a particular location or, just as easily, installed for long duration use and in either instance provide a durable, extended duty detector.

In accordance with aspects of certain embodiments of the present subject matter, methodologies are provided to provide a durable contact detector that will significantly reduce the frequency of replacement necessitated by prior devices when operated in very harsh applications.

In accordance with certain aspects of other embodiments of the present subject matter, methodologies have been developed to protect the motion sensitive sensor itself from direct impact by the sensed objects.

In accordance with yet additional aspects of further embodiments of the present subject matter, apparatus and accompanying methodologies have been developed to provide a long lasting, durable mechanism for transmitting deformation signals to a piezoelectric sensor for object detection.

According to yet still other aspects of additional embodiments of the present subject matter, apparatus and methodologies have been developed to insure long lasting, hazard free operation of a motion sensitive piezoelectric sensor.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
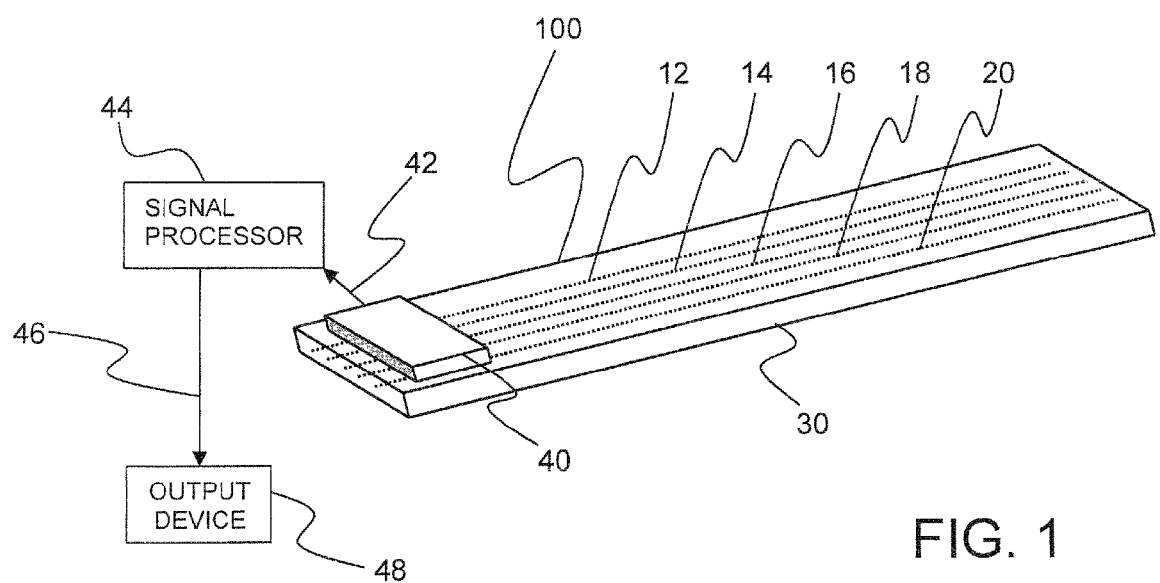
FIG. 1 illustrates an isometric view of a first exemplary embodiment of a detector in accordance with the present technology.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with a ruggedly constructed travel path sensor. An exemplary embodiment of the present subject matter may be designed for placement on a roadway or other travel path for the detection of vehicular traffic. It should be strictly understood, however, that the present subject matter is not so limited. For example, deformation sensitive sensors constructed in accordance with the present technology may be applied to other object detecting areas that, in fact, may be far removed from vehicular traffic detection. For example, the present technology may be applied to the detection of cans rolling down a delivery shoot of a production line or the contact of a person or moving object with a wall. Moreover, the present technology may be used to detect any physical contact including, but not limited to, rolling contact, sliding contact, or intermittent contact as, for example, may occur with an individual walking across an area or along a pathway.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject detector. Referring now to the drawings, FIG. 1 illustrates a first exemplary embodiment of a detector 100 in accordance with the present technology. As illustrated, construction of detector 100 may be begun by calendering a number of cables 12, 14, 16, 18, 20 into a block of rubber 30. It should be kept in mind that this form of construction is exemplary only as other construction methodologies may be employed. For example, a plurality of cables may be enclosed in rubber or similar materials by methods other than calendering including, as a non-limiting example, encasing the cables by pouring suitable material into a form into which the cables may be placed or by pouring or otherwise spreading suitable materials over the cables.

Cables 12, 14, 16, 18, 20, illustratively illustrated as five in number, may, of course, correspond to more or less cables, but in any event correspond to at least two cables running substantially the entire length of the detector 100. Cables 12-20 may be constructed from steel or other material capable of contact deformation as will be addressed further later. It should be further noted that the term cable as applied to cables 12-20 is intended to be a broad term corresponding to not only different material as noted above, but differing cross sectional areas as well including not only generally round cross sections, but also rectangular, square, triangular, oval, or any other suitable cross section.

The detector 100 in accordance with the first exemplary embodiment of The present subject matter is completed by securing a piezoelectric sensor 40 to one end surface of the rubber-calendered cables. Piezoelectric sensor 40 may be secured to the rubber-calendered cables using any suitable means including, as non-limiting examples, epoxy, adhesive, mechanical attachment, over molding, or embedding within a portion of the same rubber in which the cables 12-20 are calendered. Generally any securing method available that will permit body deformations within the rubber-calendered cables to be coupled to the piezoelectric sensor 40 is acceptable.

Piezoelectric sensor 40 may be provided with signal wires 42 to couple signals from the piezoelectric sensor 40 to a signal processor 44. Signal processor 44 is configured to process signals from the piezoelectric sensor 40 and to produce a desired output 48 via output lines 46. An output from signal processor 44 may correspond to any number of forms ranging from a switch closure, an optical output, or an audible output to more complex forms of display and/or signaling capability depending on the nature of the signaling requirements of the environment in which the detector 100 is employed.

Figure 2:
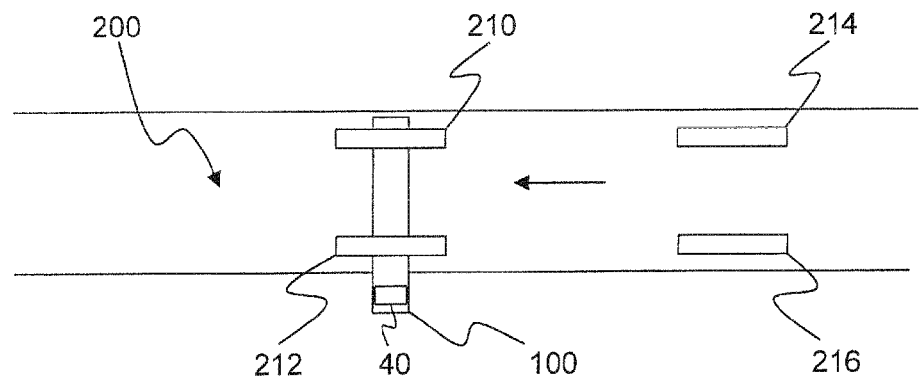
FIG. 2 illustrates a plan view of the placement of a detector in accordance with the present technology along an exemplary travel path.

With reference now to FIG. 2, the general operation of the detector 100 in an exemplary environment will be addressed. As illustrated in FIG. 2, detector 100 may be placed perpendicularly across a vehicle travel path 200 such that tires 210, 212, 214, 216 associated with a vehicle (not illustrated) may pass over and in contact with detector 100. As tires 212, 214, 216, 218 pass over any segment of detector 100, the tire contact patch driving and braking forces generate in-plane movement between cables 12, 14, 16, 18, and 20 (FIG. 1) sufficient to produce a measurable signal from piezoelectric sensor 40. Although not a requirement of the present subject matter, excitation of piezoelectric sensor 40 will be enhanced if the detector 100 is kept relatively flat on the surface of the travel path 200 as the tires 210, 212, 214, 216 roll over it.

Figure 3:
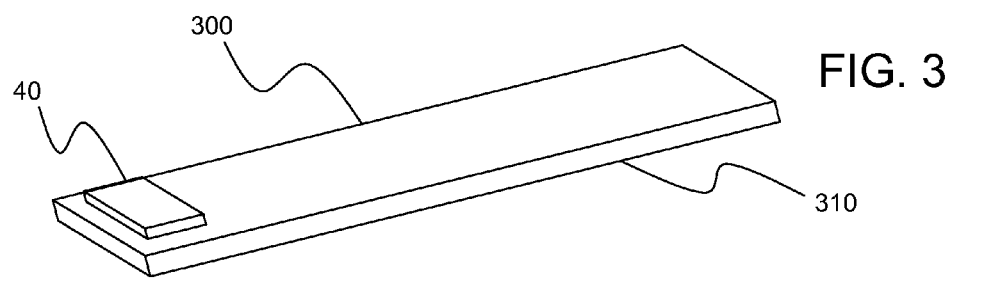
FIG. 3 illustrates an isometric view of a second exemplary embodiment of a detector in accordance with the present technology.

With reference now to FIG. 3, a second exemplary embodiment of a detector 300 in accordance with the present subject matter will be described. Detector 300, as may be seen from a comparison of FIGS. 1 and 3, is similar in construction to detector 100 illustrated in FIG. 1. Detector 300 differs from that previously illustrated in that the exemplary rubber-calendered cable construction may be replaced with a bodily deformable material. Exemplary body deformable materials may include, but are not limited to wood, metal and plastic materials. A particular material that may advantageously be employed is a polycarbonate resin material available, for example, under the trade name Lexan®.

As is understood by those of ordinary skill in the art, Lexan® is a durable polycarbonate plastic and is able to withstand extreme impact. In addition, in the event that a Lexan® strip becomes damaged or broken, it may be easily repaired or replaced in the field without special equipment as will be discussed further with respect to FIG. 7 later.

With further reference to FIG. 3, it will be seen that detector 300, may correspond to a polycarbonate resin strip 310, and may be extended across a travel path in a manner similar to that illustrated and discussed previously with respect to FIG. 2. A piezoelectric detector 40 may be secured to the polycarbonate resin strip 310 in any suitable manner. A non-limiting example of a methodology for securing piezoelectric detector 40 to the polycarbonate resin strip 310 would be through the use of a suitable adhesive, for example a cyanoacrylate or, so called "super glue." Alternative attachment means are, however, possible including mechanical attachment using appropriate clamping devices including, but not limited to, clamps, screws, bolts, and rivets. It should be appreciated that, although exemplary embodiments of the present subject matter are illustrated as a detector having a relatively long side and a relatively short side and may be referred to as a strip, such is not a limitation of the present disclosure. In fact, detectors constructed in accordance with certain exemplary embodiments of the present subject matter may be rectangular or even square.

Figure 4:
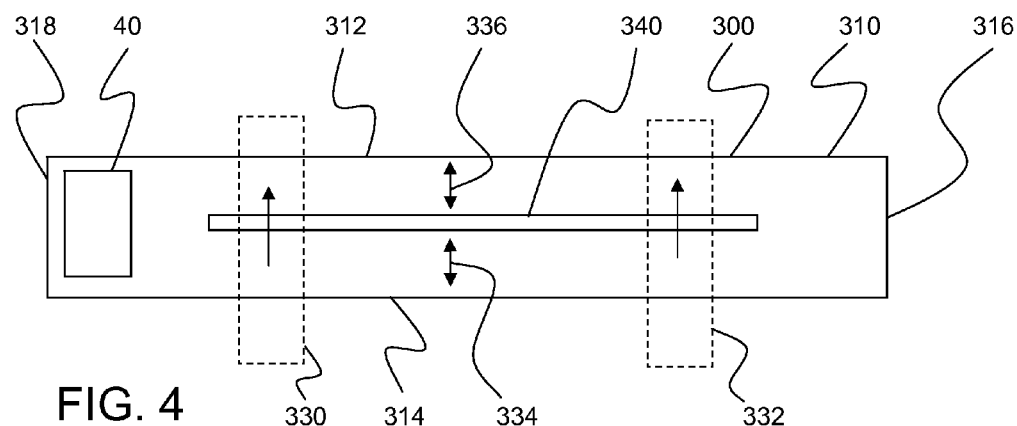
FIGS. 4-7 illustrate signal transmission improvement modifications of the second exemplary embodiment of the present subject matter.

In operation, as illustrated in FIG. 4, a detector 300, constructed in accordance with this exemplary embodiment according to the present technology, may be extended across a travel path so that vehicular traffic may pass over the detector 300. Body deformation of the polycarbonate resin strip 310 occurring upon contact of the detector 300 by vehicle tires 330, 332 will be transmitted to piezoelectric sensor 40. This form of detection takes the form of a strain detection methodology as opposed to, for example, simply vibration detection. The deformation created in the polycarbonate resin strip 310 traverses the length of the polycarbonate resin strip 310 until it reaches the piezoelectric sensor 40 to which it is transferred by virtue of the secure coupling of piezoelectric sensor 40 to polycarbonate resin strip 310. Processing of the electrical signal produced by piezoelectric sensor 40 may be conducted in a manner similar to that discussed with respect to FIG. 1.

It should again be appreciated, as previously mentioned, that a deformation detector constructed in accordance with the present technology is not limited to detection of vehicular traffic. In the case of the detector 300 embodiment of the present subject matter, such device might just as easily be secured by suitable means to a wall surface and positioned to detect individuals or objects bumping into the wall. Alternative detector 300 might be placed along an assembly line to detect product movement or along a walkway or entry way to detect movement of individuals. All such uses as well as other uses involving detection of contact by individuals or objects are envisioned.

With further reference to FIGS. 4-7 a number of modifications to the polycarbonate resin strip 310 will be addresses that may be made to increase the contact detector effectiveness. First with reference to FIG. 4, it will be seen that polycarbonate resin strip 310 has been modified to provide a longitudinally extending slot 340 extending for a substantial distance along a central portion of the length of polycarbonate resin strip 310. This construction produces two generally parallel polycarbonate resin strips 312, 314 that are coupled together at end portions 316, 318. Piezoelectric sensor 40 may be secured to either end but is exemplarily illustrated as coupled to end 318.

Those of ordinary skill in the art will appreciate that a pair of generally parallel polycarbonate resin strips produced in the manner described when placed in a travel path may not lie in an absolute parallel relationship to one another but that there will be some amount of movement of the generally parallel strips toward and away from each other especially upon traversal by a vehicle but also generally from the placement of the strips along a travel path. Thus the use of the term parallel should not be construed to be an absolute term.

As the polycarbonate resin strip 310 is traversed by vehicle tires 330, 332, deformation, illustrated by bi-directional arrows 336, 334, is created in each of the generally parallel portions 312, 314 of polycarbonate resin strip 310 and ultimately travels the length of the generally parallel portions 312, 314 of polycarbonate resin strip 310 to reach piezoelectric sensor 40. Piezoelectric sensor 40 generates an electrical signal that may be processed as previously discussed with reference to FIG. 1 to provide vehicle contact detection.

Figure 5:
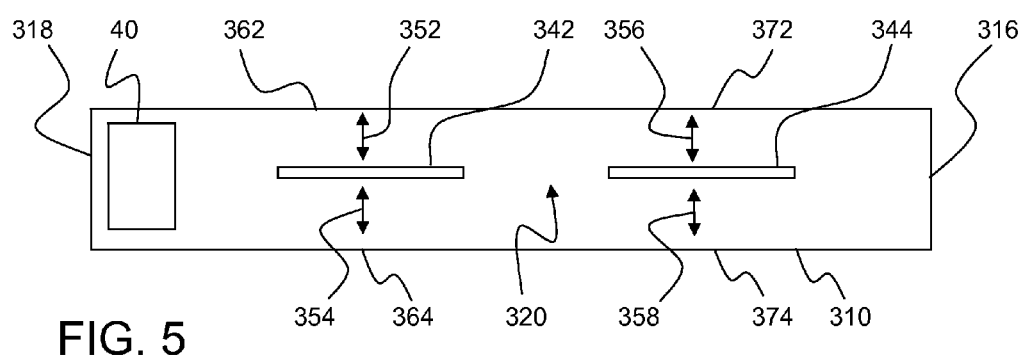

Referring now to FIG. 5, an alternative construction of the embodiment illustrated in FIG. 4 will be described. As may be seen from a comparison of the exemplary embodiments illustrated in FIGS. 4 and 5, there is significant similarity between the two embodiments. The exemplary embodiment illustrated in FIG. 5 differs from that illustrated in FIG. 4 principally by the retention of a generally mid portion 320 of polycarbonate resin strip 310 as a solid portion.

As may be seen from FIG. 5, polycarbonate resin strip 310 may be provided with a pair of longitudinally extending slot 342, 344 extending substantial distances along a central portion of the length of polycarbonate resin strip 310 from central portion 320 toward end portions 316, 318. As with the embodiment illustrated in FIG. 4, deformation, illustrated by bi-directional arrows 352, 354, 356, 358 may be produced in the generally parallel portions 362, 364 and 372, 374 of polycarbonate resin strip 310 created by the longitudinally extending slots 342, 344 as polycarbonate resin strip 310 is bodily deformed upon traversal by a passing vehicle.

Figure 6:
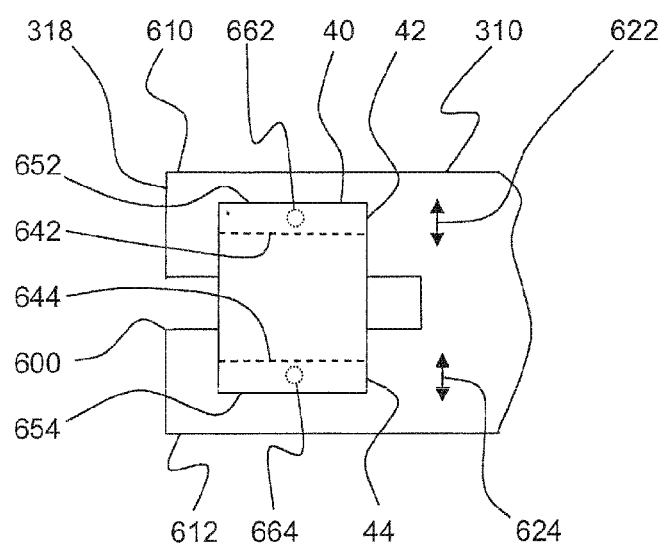

Turning now to FIG. 6, yet another exemplary embodiment of the present subject matter is illustrated showing a third exemplary methodology for increasing the sensitivity of a contact detector constructed in accordance with the present technology. As illustrated in FIG. 6, polycarbonate resin strip 310 may be configured to include a relatively short longitudinal slot 600 extending from end portion 318 of polycarbonate resin strip 310. Slot 600 may be configured to extend a length necessary so that with the placement of piezoelectric sensor 40 across the two portions 610, 612 of polycarbonate resin strip 310 produced by the creation of slot 600, sufficient space is provided to allow independent attachment of end portions 42, 44 of piezoelectric sensor 40.

Upon transversal of polycarbonate resin strip 310 by a passing vehicle, deformation as illustrated by bi-directional arrows 622, 624 will be induced in polycarbonate resin strip 310 and transmitted to the two portions 610, 612 of polycarbonate resin strip 310 across which piezoelectric sensor 40 is secured. As differing amounts of deformation are passed through the separate portion 610, 612 of polycarbonate resin strip 310, separate portion 42, 44 of piezoelectric sensor 40 are subjected to diverse amounts of deformation. Such differential application of deformation to the piezoelectric sensor 40 will tend to increase the electrical signal produced.

As previously mentioned, a number of attachment possibilities are possible for attaching piezoelectric sensor 40 to polycarbonate resin strip 310. FIG. 6 representatively illustrates two such attachment techniques. Firstly, piezoelectric sensor 40 may be secured to polycarbonate resin strip 310 by means of an adhesive generally placed between the piezoelectric sensor 40 and polycarbonate resin strip 310 in the areas defined by dashed line 642 and end 652 of piezoelectric sensor 40 and by dashed line 644 and end 654 of piezoelectric sensor 40. Alternatively piezoelectric sensor 40 may be secured to polycarbonate resin strip 310 by way of screws, bolts, rivets, or similar securing devices representatively illustrated at 662, 664.

It should be readily apparent to those of ordinary skill in the art given the above disclosure that additional embodiments of the presently disclosed detector strip are possible within the scope of the present disclosure. For example, the embodiment illustrated in FIG. 6 might be combined with either of the embodiments illustrated in FIG. 4 or 5 to produce yet other embodiments. In a similar manner, variations of the embodiment of the present technology illustrated in FIG. 5 may be provided by providing three or more slots similar to slots 342, 344 extending along the length of the polycarbonate resin strip such that there are two or more connected portions similar to portion 320 along the length of the polycarbonate resin strip 310. Alternatively plural parallel slots may be provided in addition to or in place of the one or more generally linearly aligned slots previously described.

Figure 7:
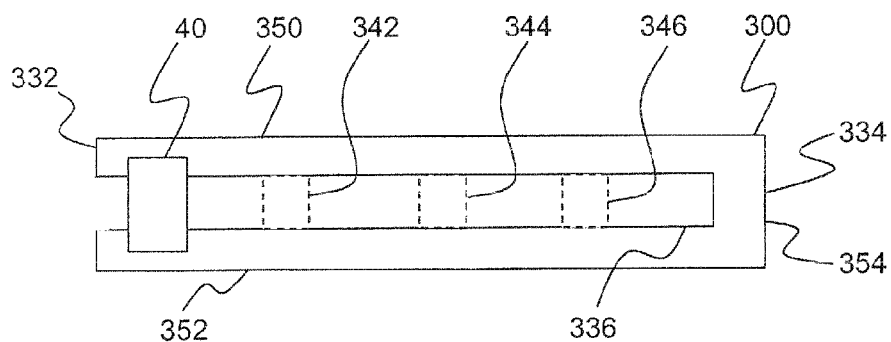

With reference now to FIG. 7, yet another exemplary embodiment of a contact sensor constructed in accordance with the present technology is illustrated. As shown in FIG. 7, a detector strip 300 corresponding to a polycarbonate resin strip is provided with a slot 336 extending from a first end 332 to a position adjacent a second end 334 resulting in an elongated "U" shaped construction having a first leg 350, a second leg 352 and a connecting portion 354. One or more bridging elements 342, 344, 346 may be placed along the length of the slot 336 to assist in maintaining the two leg portions 350, 352 of the polycarbonate resin strip in relatively parallel position. Connecting portions 352, 344, 346 may correspond to unremoved portions of the polycarbonate resin strip itself or may correspond to other materials or securing elements put in place following formation of slot 336.

It should be evident that the "U" shaped connecting portion 354 may also correspond to a securing element separate from the polycarbonate resin strip such that the detector 300 may alternatively be constructed by supplying a pair of polycarbonate resin strips and securing them in a closely spaced parallel configuration by supplying a number of bridging elements such as bridging elements 352, 344, 346.

To complete construction of this exemplary embodiment of the present subject matter, a piezoelectric sensor 40 may be secure to the open slotted end portion 332 of the polycarbonate resin strip using any of the attachment techniques discussed and illustrated previously, especially those discussed with respect to FIG. 6.

Detector strip 300 illustrated in FIGS. 3-7 may be employed as previously discussed in a number of environments. As such, detector 300 may be placed across a road or pathway to detect passage of vehicles or other pathway traffic or placed on walls or building entry ways to detect individuals or objects coming in contact with the walls or be present at the entry ways. In like manner also, manufacturing environments are envisioned in including product passage along delivery shoots and similar delivery systems as previously discussed. It should also be kept in mind that environmentally appropriate materials may be selected for use as the deformable material for the detector strip so that, wood, for example, may be used in less harsh environments and metal or other materials may be used in harsher environments.

Figure 8:
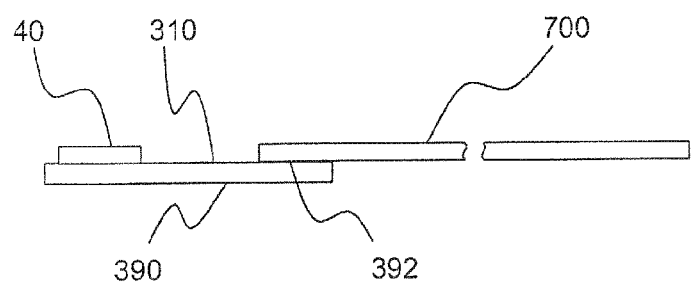
FIG. 8 illustrates an exemplary methodology for coupling a detector to a sensor in accordance with the present technology.

Finally with respect to FIG. 8 and as referenced briefly above, field repair or initial construction of the detector 300 may be affected by securing an original or replacement portion 700 of polycarbonate resin strip to a broken or intentionally severed portion 390 of polycarbonate resin strip 310. Replacement portion 700 may be secured in a manner similar to that used to secure piezoelectric sensor 40 to polycarbonate resin strip 310, i.e., by suitable adhesives including, but not limited to, the previously mentioned cyanoacrylate or, so called "super glue." Alternative attachment means are, however also possible including, but not limited to, mechanical attachment using an appropriate clamping device.

As a non-limiting example, a mechanical attachment might be employed at portion 392 of polycarbonate resin strip 310 as either a temporary or permanent form of attachment of replacement or originally provided portion 700 or, alternatively as an original means for attachment of polycarbonate resin strip 310 to a shorter portion of a polycarbonate resin strip to which piezoelectric sensor 40 may be permanently attached.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A contact detector, comprising:
   a deformable detector having a first end and a second end, said deformable detector comprising a polycarbonate resin strip having at least one slot in a central portion of the polycarbonate resin strip; and
   a piezoelectric sensor secured to the first end of said detector such that a portion of the piezoelectric sensor is disposed over the at least one slot;
   wherein contact with said detector by a tire rolling over the deformable detector will produce body deformation in at least portions of said detector and induce strain into said piezoelectric sensor.

2. The contact detector of claim 1, wherein said at least one slot comprises a pair of slots cut in said deformable detector extending outwardly from a central solid portion of said detector toward the first and second ends of said detector.

3. The contact detector of claim 1, wherein said polycarbonate resin strip comprises a slot provided at the first end of the detector.

4. The contact detector of claim 1, wherein the deformable detector comprises:
   a first portion having a first end and a second end, said piezoelectric sensor secured to the first end of the first portion, and
   a second portion, said second portion having a first end and a second end, the first end of the second portion secured to the second end of the first portion.

5. The contact detector of claim 4, wherein the first end of the second portion is adhesively secured to the second end of the first portion.

* * * * *